United States Patent
Dharawat

(10) Patent No.: US 9,131,478 B2
(45) Date of Patent: Sep. 8, 2015

(54) METHOD AND SYSTEM FOR IMPROVED COMMUNICATION AMONG PAIRED ELECTRONIC DEVICES

(71) Applicant: Motorola Mobility LLC, Libertyville, IL (US)

(72) Inventor: Parikshit Dharawat, Sunnyvale, CA (US)

(73) Assignee: Google Technology Holdings LLC, Mountain View, CA (US)

(*) Notice: Subject to any disclaimer, the term of this patent is extended or adjusted under 35 U.S.C. 154(b) by 271 days.

(21) Appl. No.: 13/801,095

(22) Filed: Mar. 13, 2013

(65) Prior Publication Data

US 2014/0274173 A1   Sep. 18, 2014

(51) Int. Cl.
| | |
|---|---|
| *H04B 5/00* | (2006.01) |
| *H04W 76/02* | (2009.01) |
| *H04M 1/725* | (2006.01) |
| *H04W 76/04* | (2009.01) |
| *H04W 92/18* | (2009.01) |

(52) U.S. Cl.
CPC .......... *H04W 76/028* (2013.01); *H04M 1/7253* (2013.01); *H04W 76/043* (2013.01); *H04W 92/18* (2013.01); *Y02B 60/50* (2013.01)

(58) Field of Classification Search
USPC ...................... 455/41.1–41.3, 550.1
See application file for complete search history.

(56) References Cited

U.S. PATENT DOCUMENTS

| | | | |
|---|---|---|---|
| 8,116,685 B2 | 2/2012 | Bregman-Amitai et al. | |
| 8,446,364 B2* | 5/2013 | Solomon | 345/156 |
| 8,775,533 B2* | 7/2014 | Hassan et al. | 709/206 |
| 2005/0289225 A1 | 12/2005 | Zhuang et al. | |
| 2006/0135064 A1* | 6/2006 | Cho et al. | 455/41.1 |
| 2011/0183612 A1 | 7/2011 | Bregman-Amitai et al. | |
| 2011/0295502 A1 | 12/2011 | Faenger | |
| 2012/0223883 A1 | 9/2012 | Solomon | |

FOREIGN PATENT DOCUMENTS

| | | |
|---|---|---|
| EP | 2391109 A1 | 11/2011 |
| WO | 2012044395 A1 | 4/2012 |

OTHER PUBLICATIONS

International Search Report and Written Opinion issued in Application No. PCT/US2014/016368 on May 16, 2014.
McCune J. M., et al., "Seeing-Is-Believing: Using Camera Phones for Human-Verifiable Authentication", Security and Privacy, 2005 IEEE Symposium on Oakland, CA, USA May 8-11, 2005, Piscataway, NJ, SA,IEEE, May 8, 2005, pp. 110-124, XP010798367.

* cited by examiner

*Primary Examiner* — Fayyaz Alam
(74) *Attorney, Agent, or Firm* — Morris & Kamlay LLP

(57) ABSTRACT

A method and system for improved communication are disclosed herein. In at least one example embodiment, the present disclosure relates to a method of communication by a first device with second and third devices. The method includes engaging in first communications with the second device, with which the first device is in a first paired relationship, terminating the first paired relationship, and either receiving from the third device a request to enter into a second paired relationship or sending to the third device the request to enter into the second paired relationship. Additionally, the method includes either outputting an image for detection by the third device, or detecting the image when output by the third device. Further, the method includes communicating with the third device so as to establish the second paired relationship with the third device and, upon establishing that relationship, automatically reestablishing the first paired relationship.

20 Claims, 5 Drawing Sheets

METHOD AND SYSTEM FOR IMPROVED COMMUNICATION AMONG PAIRED ELECTRONIC DEVICES

FIELD OF THE INVENTION

The present invention relates to electronic devices such as mobile devices and, more particularly, to methods and systems for improving the communications among such devices in contexts where the devices are paired with one another.

BACKGROUND OF THE INVENTION

Mobile devices such as cell phones, personal digital assistants (PDAs), and smart phones, as well as a variety of other electronic devices, include visual pairing capabilities. Visual pairing is a mechanism for establishing a relationship in which two or more mobile (or other electronic) devices enter into communication with one another, where the relationship is begun when one of the mobile devices displays an image, such as a bar code or text such as a URL (Uniform Resource Locator), and an other of the mobile devices detects and recognizes that image and, upon so recognizing, takes action to communicate with the first mobile device so as to enter into a paired relationship therewith that results in/allows for further communications between the devices.

Visual pairing can involves sets of more than two mobile (or other electronic) devices. In this regard, FIG. 1 is a schematic diagram 100 illustrating examples of conventional (Prior Art) visual pairing operations in which not only first and second mobile devices 102 and 104 are paired, but also in which the second mobile device and a third mobile device 106 are further paired. More particularly as shown, the first and second mobile devices 102 and 104 are paired via a first group (or phase) of operations or steps 108, and subsequently the second and third mobile devices 104 and 106 are paired via either of a second group (or phase) of operations or steps 110, or a third group (or phase) of operations or steps 112.

As shown, the pairing in the first group of steps 108 begins when the second mobile device 104 sends a signal (typically wireless) at a step 114 to the first mobile device 102 that is a request for pairing and, in response, assuming that the first mobile device approves of the possibility of such a pairing, the first mobile device then displays (generates) a coded image, as represented by a step 116. The coded image that is displayed can take a variety of forms including, for example as shown, a bar code image 118. Subsequently, as represented by a step 120, the second mobile device 104 captures (e.g., senses or detects, by way of an image sensor or the like) the coded image and decodes the coded image, which again in this example is the bar code image 118. If upon the decoding of the coded image the second mobile device 104 determines that pairing is still appropriate, then at a step 122 the second mobile device transmits data required for pairing and subsequently at a step 123 the pairing of the first and second mobile devices 102, 104 is completed and additional communication (e.g., wireless communication) between those mobile devices then proceeds.

Further as shown, the first group of steps 108 is followed, as indicated respectively by first and second arrows 144 and 146, respectively, with the second mobile device 104 being additionally paired with the third mobile device 106 in accordance with either the second group of steps 110 or the third group of steps 112, respectively. Each of the second group of steps 110 and the third group of steps 112 includes steps that are substantially similar to those of the first group of steps 110 except insofar as, although the initiator of the pairing in the second group of steps 110 is again the second mobile device 104 (as in the first group of steps), in contrast the initiator of the pairing in the third group of steps 112 is the third mobile device 106.

Thus, with respect to the second group of steps 110, the steps 124, 126, 130, 132, and 133 are identical or substantially identical to the steps 114, 116, 120, 122, and 123, respectively, except insofar the steps 126 and 133 involve the third mobile device 106 rather than the first mobile device 102 (which was involved with the steps 116 and 123). Also, in this example, rather than a bar code message being provided as the coded message, at the step 126 instead a text message 128 is shown to be provided as the coded message. Further, with respect to the third group of steps 112, the steps 134, 136, 140, 142, and 143 are identical or substantially identical to the steps 124, 126, 130, 132, and 133, respectively, except insofar the steps 134 and 142 are communications issued by the third mobile device 106 for receipt by the second mobile 104 (rather than vice-versa), it is the second mobile device (rather than the third mobile device) that performs the step 136 involving generation of a coded message, which in this example is a graphical image 138, and it is the third mobile device 140 that captures and decodes that image at the step 140. It should additionally be appreciated that, once the pairing between the second and third mobile devices 104 and 106 is completed at either of the steps 133 and 143, pairing is further established (as indicated) with the first mobile device 102 as well.

Although visual pairing techniques such as those shown in FIG. 1 are known, there remain challenges with such conventional pairing techniques. In particular when a pairing session between one or more pairs of paired mobile (or other electronic) devices within a group of such paired mobile (or other electronic) devices is terminated (e.g., after a pre-defined period of no activity, etc.), it is often inconvenient or difficult for new devices to be paired with the devices within the group. For example, it is often the case that, due to the termination of one pairing within the group, an excessive number of steps need to be performed in order for a new device to be paired with the group.

In view of the above, it would therefore be advantageous if improved methods or systems for improving the communications among such mobile or other electronic devices, in contexts where those devices are paired with one another, could be developed.

SUMMARY OF THE INVENTION

In at least one example embodiment, the present disclosure relates to a method of communication by a first mobile device with second and third mobile devices. The method includes engaging in first communications with the second mobile device, with which the first mobile device is in a first paired relationship, terminating the first paired relationship, and either receiving from the third mobile device a request to enter into a second paired relationship with the third mobile device or sending to the third mobile device the request to enter into the second paired relationship. Additionally, the method includes either outputting an image for detection by the third mobile device, or detecting the image when output by the third mobile device. Further, the method includes communicating with the third mobile device so as to establish the second paired relationship with the third mobile device and, upon establishing the second paired relationship, automatically reestablishing the first paired relationship.

Also, in at least one further example embodiment, the present disclosure relates to a method of reestablishing a first communication arrangement between a first electronic device and a second electronic device that has been terminated. The method includes either receiving at the first electronic device from a third electronic device a request to enter into a second communication relationship with the third electronic device or sending from the first electronic device for receipt by the third electronic device the request to enter into the second communication relationship. The method also includes either outputting from the first electronic device an image for detection by the third electronic device, or detecting the image at the first electronic device when the image is output by the third electronic device. The method further includes communicating with the third electronic device so as to establish the second communication arrangement with the third electronic device, where the second communication arrangement is a visual pairing relationship and, upon the second communication arrangement being established, either sending from the first electronic device for receipt by the second electronic device or receiving at the first electronic device from the second electronic device a previously-exchanged code. The first communication arrangement between the first and second electronic devices is reestablished upon the previously-exchanged code being recognized or accepted by at least one of the first and second electronic devices.

Further, in at least one additional example embodiment, the present disclosure relates to a first mobile device configured for reestablishing, with a second mobile device, a first visual pairing relationship that has been terminated. The first mobile device includes at least one memory component configured to store a first code and first image data, and either a visual output component configured to display a first image based at least upon the first image data for receipt by a third mobile device, or a visual input component configured to sense light output by the third mobile device that is representative of the first image. The first mobile device further includes at least one wireless transceiver configured to send for receipt by the third mobile device, or to receive from the third mobile device, at least one first wireless signal, and further configured to send for receipt by the second mobile device at least one second wireless signal including information based at least indirectly upon the first code. The first mobile device also includes a processing device coupled at least indirectly to each of the at least one memory component, to either the visual output component or the visual input component, and to the at least one wireless transceiver. The processing device is configured to make a first determination that a second visual pairing relationship has been established between the first mobile device and the third mobile device based at least indirectly upon an internal signal indicative of the sensed light or upon the at least one first wireless signal and further, upon the first determination being made, to cause the at least one wireless transceiver to send the at least one second wireless signal for receipt by the second mobile device, whereby at least indirectly in response to the at least one second wireless signal the first visual pairing relationship is reestablished.

DETAILED DESCRIPTION

Embodiments described herein include, but are not limited to, improved methods or systems for establishing, maintaining, and/or reestablishing visual pairing relationships among multiple intercommunicating mobile or other electronic devices, particularly multiple mobile or other electronic devices that are associated with a single user (e.g., a single person). In at least some such embodiments, the improved method or system particularly enable a paired relationship between two mobile or other electronic devices to be automatically and easily reestablished even after the paired relationship between those two devices has been previously terminated, when an additional mobile or other electronic device establishes a visually paired relationship with one of those two previously-paired devices.

Figure 1:
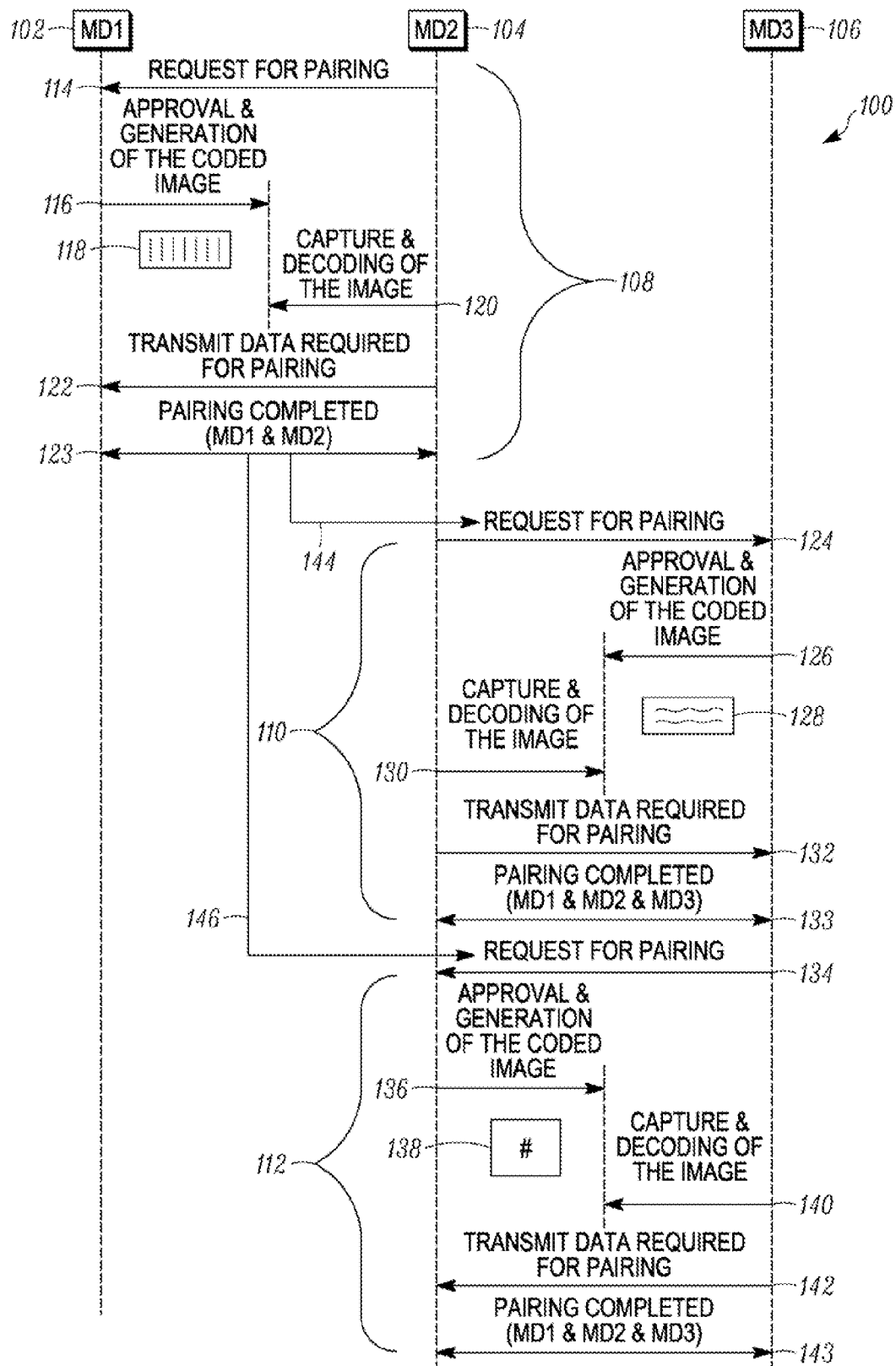
FIG. 1 shows a schematic diagram illustrating example Prior Art steps of operations by which three different example electronic (in this example, mobile) devices are visually paired.

More particularly, in some such embodiments, even though a previously-existing visually paired relationship is currently defunct (or dormant) when a new device attempts to establish a visually paired relationship with one of the previously-paired devices, the improved method or system for pairing allows the previously-existing paired relationship to be reestablished/resurrected when the new device establishes the new pairing relationship without needing to re-perform standard visual pairing operations (e.g., a full set of steps such as the steps of one of the groups of steps 108, 110, or 112 shown in FIG. 1 involving the generation and recognition of a coded image). Rather, reestablishment of the previously-existing paired relationship is achieved more simply by way of a process in which previously-exchanged code information (not visual image information) is communicated between the previously-paired devices and used as the basis for determining that the previously-paired devices should again be paired.

Figure 2:
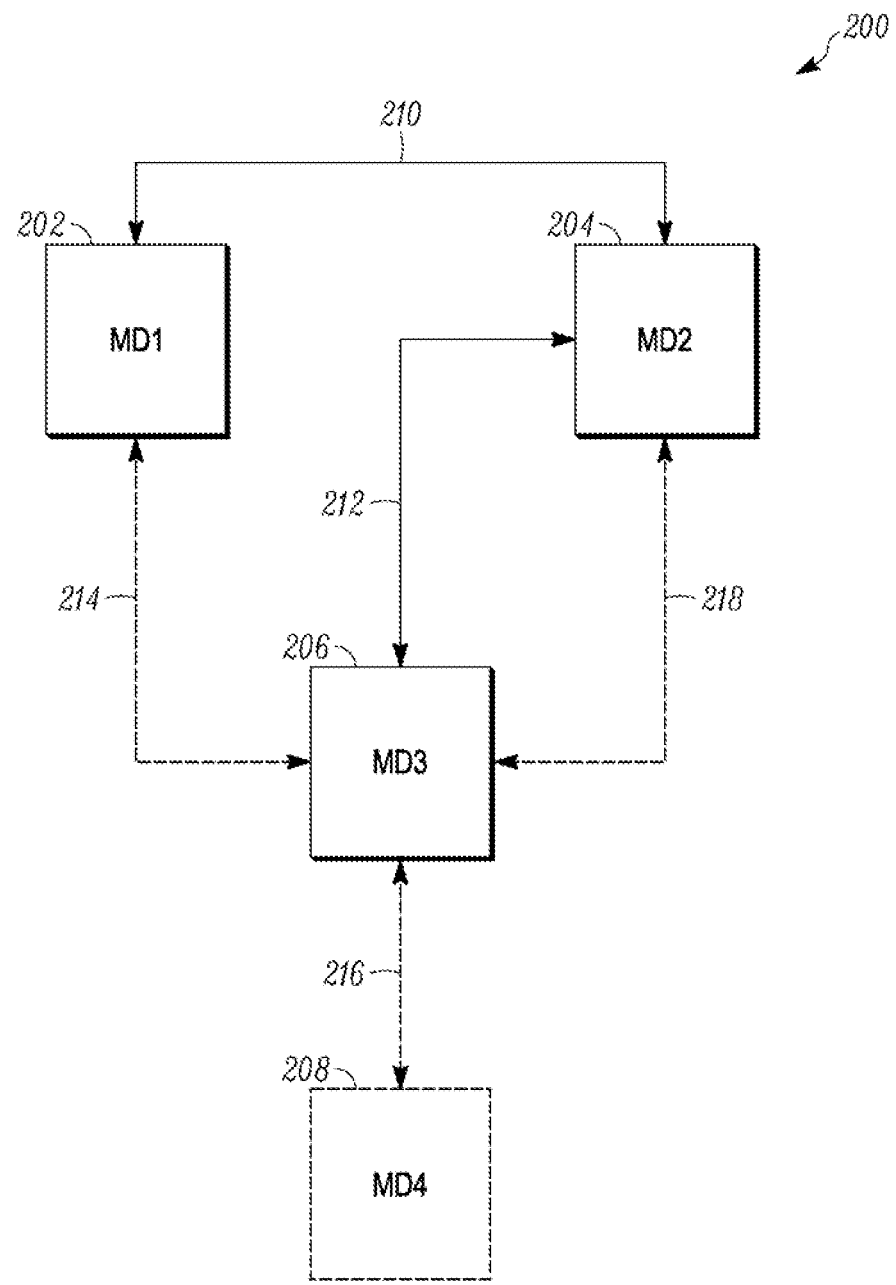
FIG. 2 shows a schematic of multiple (in this example, four) electronic devices, which in this example are mobile devices, which are capable of being visually paired and that are capable of communications with one another in accordance with example processes encompassed herein.
Figure 4A:
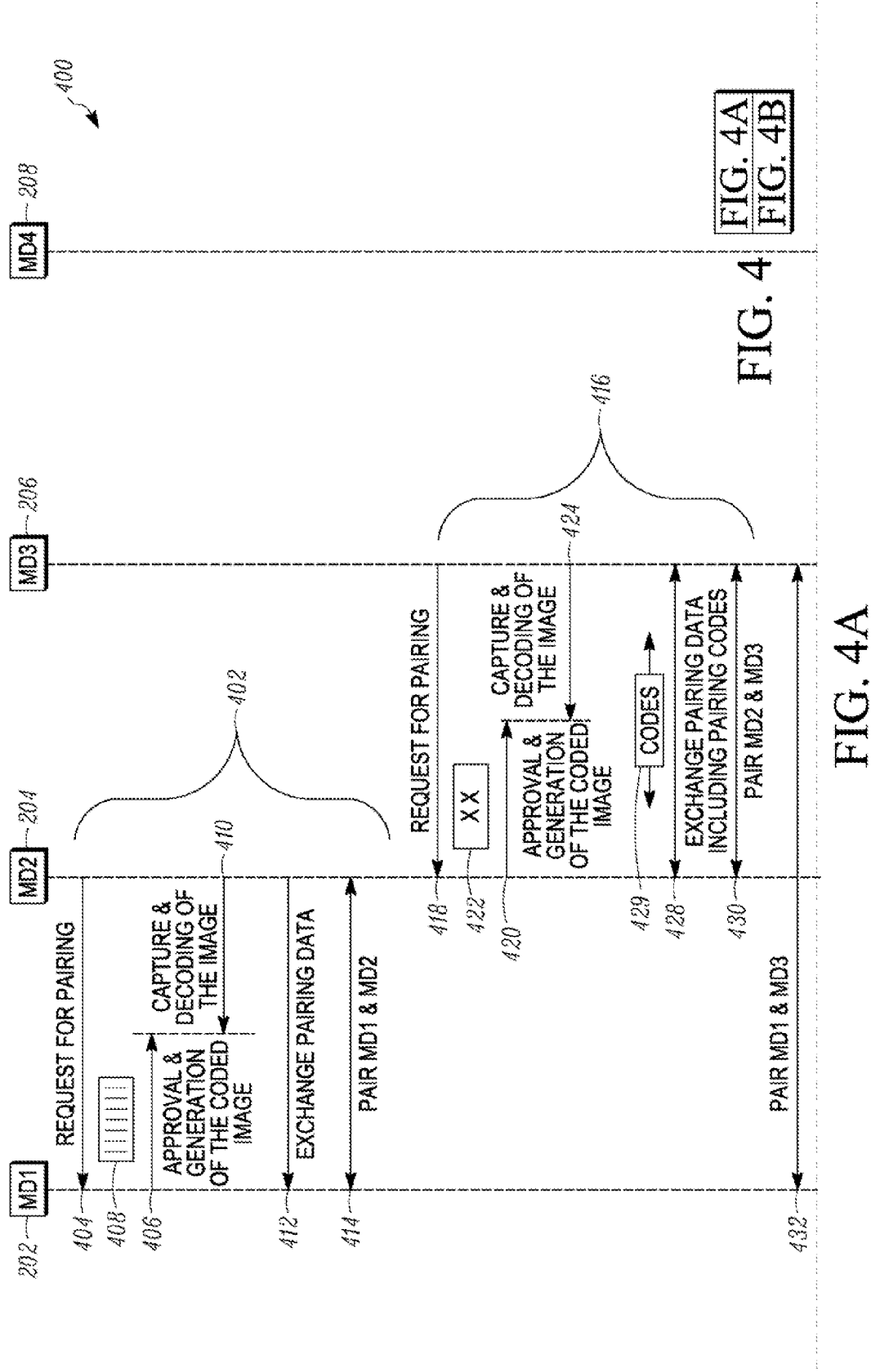
FIG. 4, represented by FIGS. 4A and 4B, shows a schematic diagram illustrating example steps of an improved technique for conducting communications among the mobile devices shown in FIG. 2.
Figure 4B:
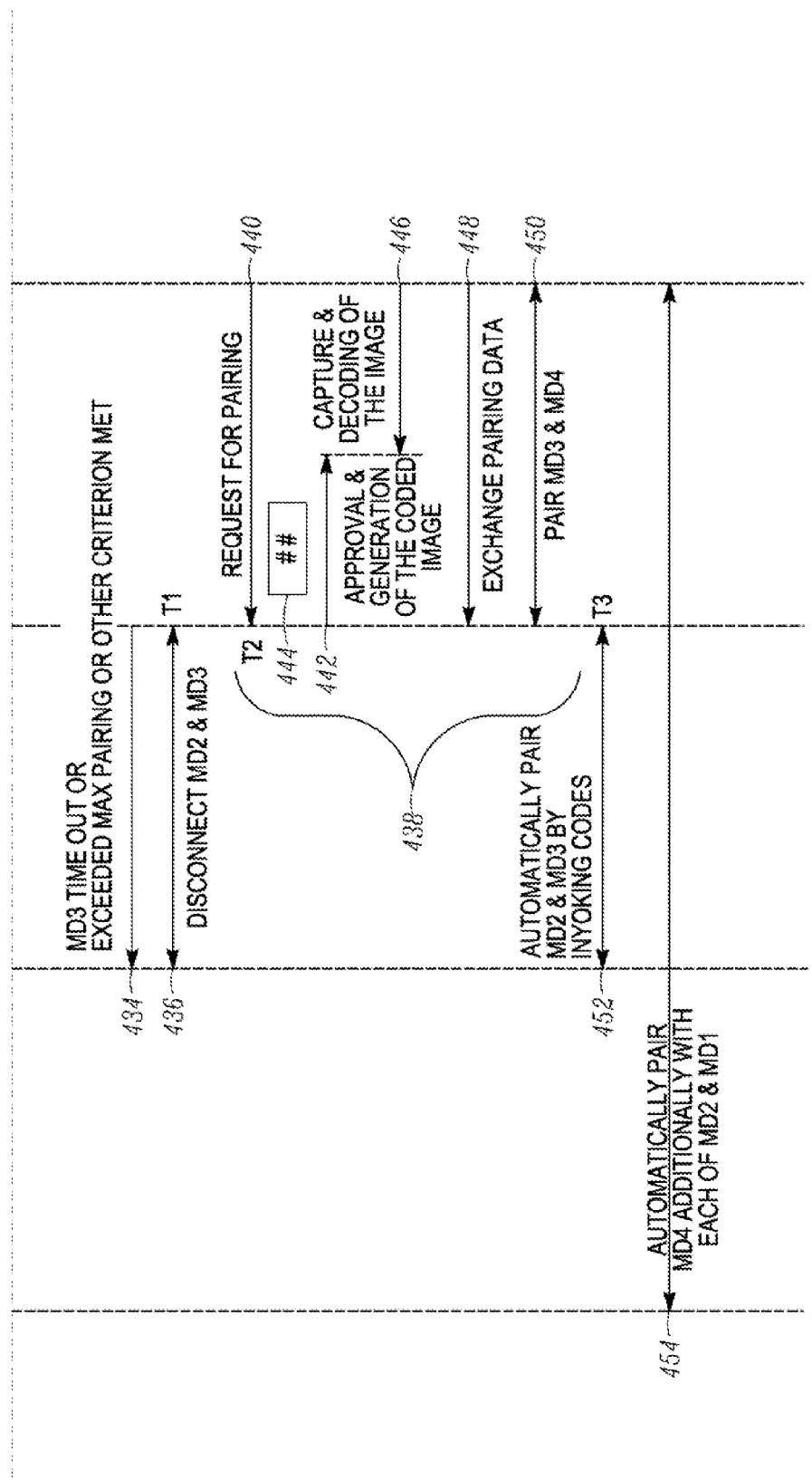

Referring to FIG. 2, an example of a communication system 200 having a set of multiple mobile devices that can be visually paired and intercommunicate with one another as described below is shown. In this example, the communication system 200 particularly includes first, second, third, and fourth mobile devices 202, 204, 206, and 208, respectively (which are also represented in FIG. 2 and FIGS. 4A and 4B as MD1, MD2, MD3, and MD4, respectively). That said, the present disclosure is intended to encompass communication systems having any arbitrary number of intercommunicating mobile devices (or other electronic devices as discussed below), and particularly communication systems having any arbitrary number of intercommunicating mobile (or other electronic) devices in which there are at least three potentially-paired or potentially-intercommunicating mobile devices. In the present example embodiment, all of the intercommunicating mobile (or other electronic) devices are associated with the same user.

It should be appreciated that each of the mobile devices 202, 204, 206, and 208 is intended to be representative of any of a variety of mobile devices including, for example, cellular telephones, personal digital assistants (PDAs), smart phones, or other handheld or portable electronic devices. In alternate embodiments, any of the mobile devices can also be a headset, MP3 player, battery-powered device, wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other mobile device. Additionally, although FIG. 2 particularly shows the communication system 200 as including the mobile devices 202, 204, 206, and 208, each of the mobile devices is intended to be representative not only of a variety of types of mobile devices but also of other electronic devices as well. Indeed, embodiments of the present disclosure are intended to be applicable to any of a variety of electronic devices that are capable of performing visual pairing operations with other electronic devices.

Further, although the present example embodiment envisions that the mobile devices of the communication system 200 (or other electronic devices of a communication system) are paired via one or more visual pairing operations, the present disclosure is intended also to encompass other communication systems in which one or more pairs of mobile (or other electronic) devices are paired by way of other techniques, in addition to or instead of one or more pairs of the mobile (or other electronic) devices of the communication system being paired by way of visual pairing operations. That is, the present disclosure is not intended to be limited exclusively to communication systems in which all of the pairings among the intercommunicating devices of the communication systems necessarily have been established by way of visual pairing techniques as opposed to other pairing techniques.

As mentioned above and discussed further below, the present disclosure particularly in at least some embodiments envisions a process by which, even though a visually-paired relationship between two devices is no longer active (or has been terminated), that pairing relationship can be reactivated when a third device enters into a visual pairing relationship with one of those two previously-paired devices. In this regard, FIG. 2 shows multiple communication links 210, 212, 214, 216, and 218 among the various ones of the mobile devices 202, 204, 206, and 208 that represent visual pairing relationships/intercommunications among the mobile devices in accordance with one example embodiment of the present disclosure. Details regarding the communication links 210, 212, 214, 216, and 218, including details regarding the particular type(s) of communications that those communication links represent or entail, and time(s) at which those communications can occur, are described in relation to FIG. 4 (represented by FIGS. 4A and 4B) below.

Figure 3:
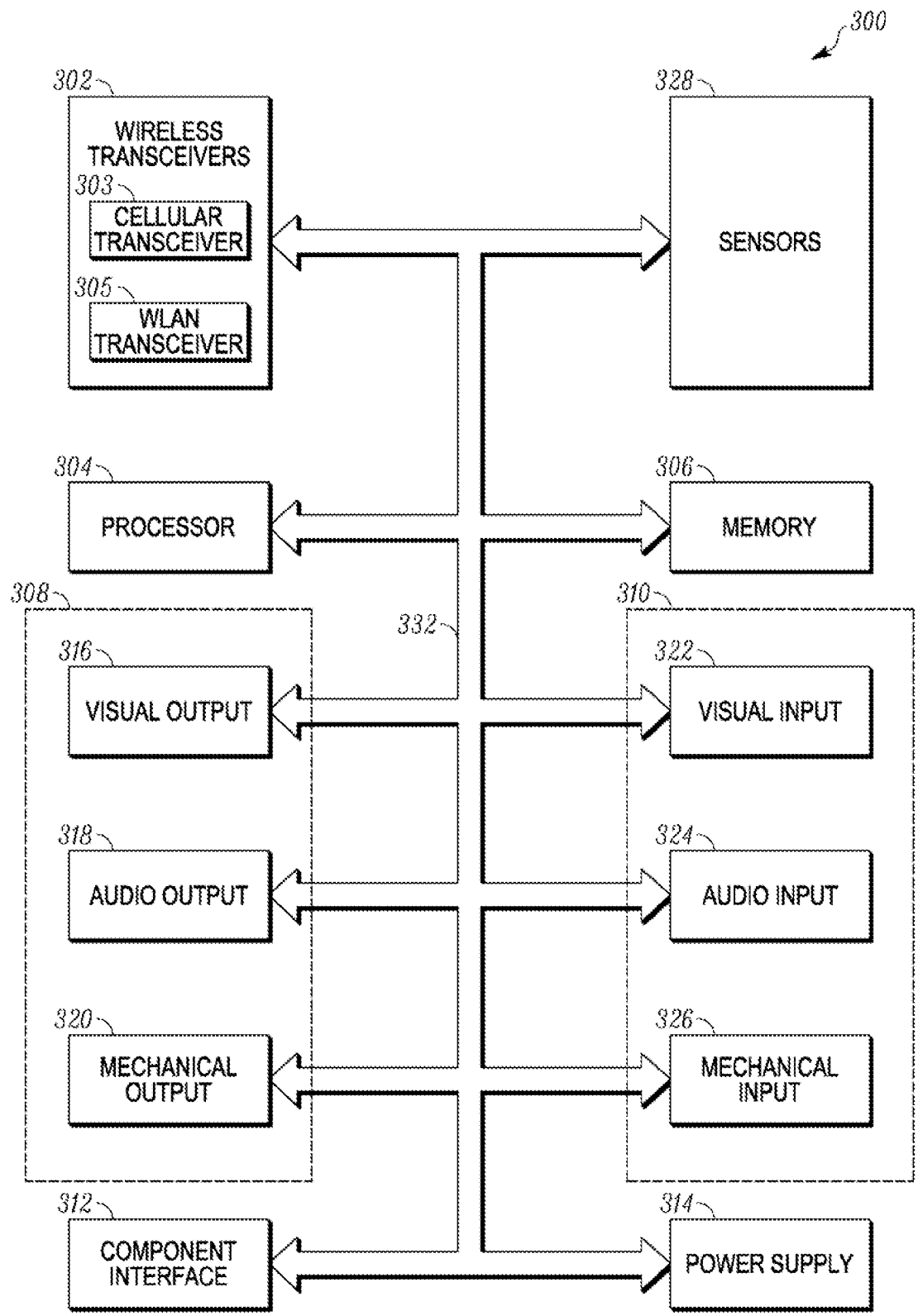
FIG. 3 is a block diagram showing example components of one of the mobile devices of FIG. 2.

Referring to FIG. 3, there is provided a block diagram illustrating example internal components 300 of a mobile device. For purposes of this description, it will be stated that the internal components 300 particularly are those of the third mobile device 206 of FIG. 2. However, it should be understood that each of the other mobile devices shown in FIG. 2 (namely, each of the first, second, and fourth mobile devices 202, 204, and 208) can also have internal components that are the same as the internal components 300 of FIG. 3. Indeed, other mobile devices or other electronic devices of other embodiments encompassed by the present disclosure can also have internal components that are the same as the internal components 300 shown in FIG. 3. Additionally, although the internal components 300 shown in FIG. 3 are one example of internal components that can be provided in the mobile device 206 (as well as in any of the mobile devices 202, 204, and 208 or other mobile or electronic devices encompassed herein) it should be appreciated that, in alternate embodiments, the internal components encompassed by any one or more of the mobile or other electronic devices forming communication system(s) encompassed by the present disclosure can take other forms, can include other internal components in addition to or instead of those shown in FIG. 3, and need not include all of the internal components shown in FIG. 3.

As shown in FIG. 3, the internal components 300 include one or more wireless transceivers 302, a processor 304 (e.g., a microprocessor, microcomputer, application-specific integrated circuit, etc.), a memory portion 306, one or more output devices 308, and one or more input devices 310. The internal components 300 can further include a component interface 312 to provide a direct connection to auxiliary components or accessories for additional or enhanced functionality. The internal components 300 preferably also include a power supply 314, such as a battery, for providing power to the other internal components while enabling the mobile device to be portable. Further, the internal components 300 additionally include one or more sensors 328. All of the internal components 300 can be coupled to one another, and in communication with one another, by way of one or more internal communication links 332 (e.g., an internal bus).

Further, in the present embodiment of FIG. 3, the wireless transceivers 302 particularly include a cellular transceiver 303 and a Wi-Fi transceiver 305. More particularly, the cellular transceiver 303 is configured to conduct cellular communications, such as 3G, 4G, 4G-LTE, vis-à-vis cell towers (not shown), albeit in other embodiments, the cellular transceiver 303 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 305 is a wireless local area network (WLAN) transceiver configured to conduct Wi-Fi communications in accordance with the IEEE 802.11 (a, b, g, or n) standard with access points. In other embodiments, the Wi-Fi transceiver 305 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 305 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the internal components 300 are shown to include two of the wireless transceivers 302 (that is, the transceivers 303 and 305), the present disclosure is intended to encompass numerous embodiments in which any arbitrary number of wireless transceivers employing any arbitrary number of communication technologies are present. By virtue of the use of the wireless transceivers 302, the third mobile device 206 is capable of communicating with the first, second, and fourth mobile devices 202, 204, and 208 shown in FIG. 2, and particularly engages in wireless communications with those mobile devices during particular operations associated with the establishment or reestablishment of pairing relationships with those mobile devices, which in at least some circumstances as discussed below can be in addition to or instead of operations involving the output and detection of coded images typically performed during visual pairing (as already discussed in relation to FIG. 1).

Additionally by virtue of the use of the wireless transceivers 302, the third mobile device 206 is capable of communicating with the first, second, and fourth mobile devices 202, 204, and 208 more generally once the pairing relationships among those devices have been established, for example, after visual pairing has occurred between the third mobile device 206 and one or more of the first, second, and fourth mobile devices 202, 204, and 208. Further, the wireless transceivers 302 also make it possible for the third mobile device 206 to communicate with, depending upon the embodiment, any of a variety of other devices or systems including, for example, other mobile or electronic devices, web servers, cell towers, access points, other remote devices, etc. Thus, depending upon the embodiment or circumstance, wireless communication between the third mobile device 206 and any arbitrary number of other devices or systems can be achieved, including but not limited wireless communication with the first, second, and fourth mobile devices 202, 204, and 208 with which the third mobile device is being or has been paired.

Operation of the wireless transceivers 302 in conjunction with others of the internal components 300 of the third mobile device 206 can take a variety of forms. For example, operation of the wireless transceivers 302 can proceed in a manner in which, upon reception of wireless signals, the internal components 300 detect communication signals and the transceivers 302 demodulate the communication signals to recover incoming information, such as voice and/or data including for example various codes, transmitted by the wireless signals. After receiving the incoming information from the transceivers 302, the processor 304 performs any of a variety of types of processing or operations in relation to the information including, for example, processing to determine whether portion(s) of the information satisfy particular criteria or not, or formatting of the incoming information for the one or more output devices 308.

For transmission of wireless signals, the processor 304 formats outgoing information and conveys the outgoing information to one or more of the wireless transceivers 302 for modulation so as to provide modulated communication signals to be transmitted. The operation of the processor 304 in this regard can occur in response to any of a variety of events or actions including, for example, the capture and decoding of a coded image such as was discussed above in relation to the step 120 of FIG. 1 and is also discussed below in relation to FIG. 4 (represented by FIGS. 4A and 4B), the establishment of a pairing relationship of the mobile device 206 in relation to another mobile device as discussed further below in relation to FIG. 4 (represented by FIGS. 4A and 4B), or signal(s) from one or more of the input devices 310 indicative of a user command or triggering event.

Depending upon the embodiment, the input and output devices 308, 310 of the internal components 300 can include a variety of visual, audio and/or mechanical outputs. For example, the output device(s) 308 can include one or more visual output devices 316 such as a liquid crystal display and/or light emitting diode indicator, one or more audio output devices 318 such as a speaker, alarm, and/or buzzer, and/or one or more mechanical output devices 320 such as a vibrating mechanism. The visual output devices 316 among other things can also include a video screen. Likewise, by example, the input device(s) 310 can include one or more visual input devices 322 such as an image or optical sensor or detector (for example, a camera lens and photosensor/photodetector), one or more audio input devices 324 such as a microphone, and/or one or more mechanical input devices 326 such as a flip sensor, keyboard, keypad, selection button, navigation cluster, touch pad, capacitive sensor, motion sensor, and/or switch. Operations that can actuate one or more of the input devices 310 can include not only the physical pressing/actuation of buttons or other actuators, but can also include, for example, opening the third mobile device 206, unlocking the device, moving the device to actuate a motion, moving the device to actuate a location positioning system, and operating the device.

As mentioned above, the internal components 300 also can include one or more of various types of sensors 328. The sensors 328 can include, for example, proximity sensors (e.g., a light detecting sensor, an ultrasound transceiver or an infrared transceiver), touch sensors, altitude sensors, and/or one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 206. Although the sensors 328 for the purposes of FIG. 3 are considered to be distinct from the input devices 310, in other embodiments it is possible that one or more of the input devices can also be considered to constitute one or more of the sensors (and vice-versa). Additionally, although in the present embodiment the input devices 310 are shown to be distinct from the output devices 308, it should be recognized that in some embodiments one or more devices serve both as input device(s) and output device(s). For example, assuming that the mobile device 206 includes a touch screen display, the touch screen display can be considered to constitute both one of the visual output devices 316 and one of the mechanical input devices 326.

The memory portion 306 of the internal components 300 can encompass one or more memory devices of any of a variety of forms (e.g., read-only memory, random access memory, static random access memory, dynamic random access memory, etc.), and can be used by the processor 304 to store and retrieve data. In some embodiments, the memory portion 306 can be integrated with the processor 304 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 306 of the third mobile device 206 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 302, or connections via the component interface 312.

The data that is stored by the memory portion 306 can include, but need not be limited to, operating systems, programs (applications), and informational data. Each operating system includes executable code that controls basic functions of the third mobile device 206, such as interaction among the various components included among the internal components 300, communication with external devices (e.g., the first, second, and fourth mobile devices 202, 204, and 208) via the wireless transceivers 302 and/or the component interface 312, and storage and retrieval of programs and data, to and from the memory portion 306.

As for programs, each program includes executable code that utilizes an operating system to provide more specific functionality, such as file system service and handling of protected and unprotected data stored in the memory portion 306. Such programs can include, among other things, programming for enabling a visual pairing relationship of the third mobile device 206 with one or more other mobile or electronic devices such as the first, second, and fourth mobile devices 202, 204, and 208 to be established or reestablished as discussed further below. More particularly, such programs can include, among other things, one or more programs for performing a process such as the process described below in relation to FIG. 4 (represented by FIGS. 4A and 4B), in which the third mobile device 206 recommences wireless communications with one of the mobile devices (e.g., the second mobile device 204), with which the third mobile device had previously been in a visually paired relationship that subsequently went defunct, following establishment of a visually paired relationship with another mobile device (e.g., the fourth mobile device 208).

Finally, with respect to informational data, this is non-executable code or information that can be referenced and/or manipulated by an operating system or program for performing functions of the third mobile device 206 or otherwise. This informational data can include, for example, information based upon which the third mobile device 206 can generate a coded image for recognition by another mobile device during a visual pairing operation, or information based upon which the third mobile device recognizes that a detected coded image displayed by another mobile device during a visual pairing operation is sufficient as a basis for establishment of the visually paired relationship. Also, this information can include other code(s) that can be wirelessly communicated in relation to others of the mobile devices 202, 204, 208, and that the third mobile device 206 can utilize to reestablish a previously-existing pairing relationship, as discussed in further detail with respect to FIG. 4 (represented by FIGS. 4A and 4B) below.

Referring to FIG. 4, represented by FIGS. 4A and 4B, a schematic diagram 400 is provided that shows exemplary steps of operation of the communication system 200 of FIG. 2 and particularly the mobile devices 202, 204, 206, and 208 thereof. As shown in FIGS. 4A and 4B and discussed further below, in this embodiment, the second mobile device 204 initially is visually-paired with each of the first mobile device 202 and the third mobile device 206, but then becomes disconnected from the mobile device 206 after a period of time. Nevertheless, as shown, when there arises a visual pairing relationship between the third mobile device 206 and a fourth mobile device 208, in accordance with the present process, the pairing relationship and associated communication between the third mobile device 206 and the second mobile device 204 is reestablished/resurrected, and this is accomplished without any need to re-perform several of the operations that were initially employed in originally establishing the paired relationship between the second and third mobile devices.

The schematic diagram 400 of FIG. 4, represented by FIGS. 4A and 4B, particularly shows several different operations or steps, and groups of operations or steps. In a first group of operations or steps 402, the first and second mobile devices 202 and 204 are visually-paired. As shown, the first group of steps 402 begins with a step 404 at which the second mobile device 204 sends a request for pairing signal to the first mobile device 202, with the request for pairing signal being sent wirelessly between (that is, by way of wireless transceivers of) the first and second mobile devices. Subsequent to the step 404, at a step 406 the first mobile device 202 generates or outputs a coded image 408 that is indicative of its approval of the request for pairing, by displaying the coded image on a visual display device of the first mobile device, and at a step 410 the second mobile device captures the coded image (e.g., by way of an image sensor) and decodes that image. Finally, at a step 412, the first and second mobile devices 202, 204 exchange pairing data, again by way of wireless communications therebetween, and then at a step 414 the two mobile devices are paired and the visual pairing process is complete. It will be appreciated that in the present embodiment the steps 404, 406, 410, 412, and 414 of FIGS. 4A and 4B are identical or substantially identical to the steps 114, 116, 120, 122, and 123 shown in FIG. 1, respectively.

Subsequent to the first group of steps 402 being completed, a second group of steps 416 is performed. More particularly, the second group of steps 416 includes a step 418 at which the third mobile device 206 sends a request for pairing signal to the second mobile device 204. As with respect to the step 404, this signal is transmitted wirelessly, in this case by the wireless transceivers 302 of the third mobile device 206 for receipt by wireless transceivers of the second mobile device. Subsequent to the step 418, at a step 420 the second mobile device 204 determines that it approves of the possibility of the pairing relationship being established and accordingly generates a coded image 422 that is displayed on the second mobile device by way of a visual display device thereof. Then at a step 424 the third mobile device 206 captures and decodes the coded image 422, for example by way of an image sensor on the third mobile device 206, which is among the visual input devices 322 of the third mobile device.

Further, at a step 428, the second and third mobile devices 204 and 206 exchange pairing data and then at a step 430 the visual pairing of the second and third mobile devices is complete. As shown, the exchanging of this pairing data at the step 428 in the present embodiment particularly includes the exchanging of one or more pairing codes 429, which as discussed below are used in the present process later on for reestablishment of the pairing relationship between the second and third mobile devices 204, 206 subsequent to a time at which the relationship has been terminated. Further, in this example, the exchanging of the pairing data at the step 428 occurs in both directions (as indicated by the double-headed arrow representing the step 428 in FIG. 4A). That is, at least one code is generated by the second mobile device 204 and transmitted wirelessly to the third mobile device 206, and also at least one additional code is generated by the third mobile device and transmitted wirelessly to the second mobile device.

Given these aspects of the step 428, although the steps 418, 420, 424, and 430 of the second group of steps 416 are respectively identical or substantially identical to the steps 134, 136, 140, and 143 of the group of steps 112 shown in FIG. 1, the step 428 is different from the step 142 of FIG. 1, insofar as the step 428 in contrast to the step 142 particularly involves the exchanging of the pairing codes 429 that allow for automatic reestablishing of the pairing relationship at a later time even after the pairing relationship has been terminated. Further, in contrast to the step 142, the step 428 in the present embodiment involves wireless transmissions in each direction, from the second mobile device 204 to the third mobile device 206 and vice-versa, rather than merely in one direction (e.g., from the third mobile device 106 to the second mobile device 104 as shown in FIG. 2). That said, in some alternate embodiments encompassed by the present disclosure, one or more of the pairing codes 429 need only be transmitted in one direction from the second mobile device 204 to the third mobile device 206 or vice-versa, rather than in both directions.

It will be further appreciated that the visual pairing of the second and third mobile devices 204, 206 results after one of the already-paired mobile devices (in this example, the second mobile device) is contacted from the outside by an additional mobile device (in this example, the third mobile device). Nevertheless, in other embodiments, the visual pairing of the second and third mobile device 204, 206 can result after one of the already-paired mobile devices contacts an additional unpaired mobile device, e.g., where the second mobile device would contact the third mobile device. In such case, rather than the group of steps 416 being performed, a modified version of that group of steps would be performed, in which the step 418 at which the request for pairing was sent would involve wireless transmission of a signal from the second mobile device 204 to the third mobile device 206, the step 420 at which the coded image is generated would be modified to involve display of the coded image by the third mobile device 206 rather than the second mobile device 204, and the step 424 at which the coded image is captured and detected would be performed by the second mobile device rather than the third mobile device. Such modified versions of the steps 418, 420, and 424 would be identical or substantially identical to the second group of steps 110 shown in FIG. 1, in which the mobile device 104 (which has already been paired with the mobile device 102) initiates the establishment of a visual pairing relationship the mobile device 106. Other than the above-mentioned modifications to the steps 418, 420, and 424, however, the steps 428 and 430 of FIG. 4A would still be performed in the same manner as discussed above, even in this context in which the already-paired second mobile device 204 serves to initiate establishment of the visual pairing relationship with the third mobile device 206.

Once the third mobile device 206 is visually-paired with the second mobile device 204 upon completion of the group of steps 416 (or upon completion of a modified version of that group of steps in which the second mobile device initiates the pairing with the third mobile device as discussed above), the third mobile device 206 further correspondingly becomes paired with the first mobile device 202, since the second mobile device 204 is already in a visually-paired relationship with the first mobile device 202. This paired relationship can be direct or indirect and establishment of this pairing relationship between the first and third mobile devices 202 and 206 is represented in the FIG. 4A by a step 432, at which those devices are paired. As indicated, no steps corresponding to the steps discussed above concerning requests for pairing, approval or generation of coded images, capturing and decoding of any coded images, or exchanging of pairing data (e.g., the steps 404, 406, 410, 412, 418, 420, 424, and 428) need to be performed in order for this pairing of the first and third mobile devices 202 and 206 to occur.

Referring further to FIG. 2 in this regard, as a result of the group of steps 402, group of steps 416, and the step 432, all of the first, second, and third mobile devices 202, 204, and 206 are visually paired with one another, and wireless communications can then occur among each of the first, second, and third mobile devices. More particularly, the wireless communications that can occur between the visually-paired first and second mobile devices 202 and 204 is represented by the communication link 210 shown in FIG. 2, the wireless communications that can occur between the second and third visually-paired mobile devices 204 and 206 is represented by the communication link 212, and further the wireless communications that can occur between the first mobile device 202 and the third mobile device 206 is indicated by the communication link 214. The communication link 214 is shown to be a dashed line since, in the present example embodiment, the actual wireless communications between the first mobile device 202 and the third mobile device 206 is only indirect, by virtue of the actual direct wireless communications between the first and second mobile devices 202, 204 (represented by the communication link 210) and the second and third mobile devices 204, 206 (represented by the communication link 212).

Notwithstanding the establishment of these visual pairing relationships among the first, second, and third mobile devices 202, 204, and 206, respectively, at some point or depending on some circumstances, the visual pairing between two or more of these devices can be broken or go defunct (or become dormant). For example, the visual pairing relationship between the second and third mobile devices 204 and 206 can potentially be terminated because a predetermined amount of time has elapsed since the pairing took place or since the last wireless communications between those mobile devices occurred following the visual pairing of those devices. Also, for example, some other event can take place that would result in termination of the pairing session including, for example, the determination that the pairing relationship must be ceased (or wireless communications between those devices must be ceased) in order to minimize or reduce battery power drain or to minimize data communications. In FIGS. 4A and 4B, as an example, a step 434 is shown to be performed in which one of these events occurs (e.g., either a predetermined amount of time has elapsed since the pairing between the second and third mobile devices 2024, 206 occurred at the step 430, a maximum number of pairing events has just been exceeded, or another criterion has met). Following the step 434, at a step 436, the pairing relationship between the second and third mobile devices 204 and 206 is ended and those devices are disconnected such that wireless communications between those devices ceases.

Notwithstanding such a termination of a visual pairing relationship, in the present embodiment it is recognized that, at a later time, it may be desired to resurrect or reestablish the visual pairing relationship between the previously-paired but now disconnected mobile devices, for example, when yet another mobile device attempts to become visually-paired with one of the previously-paired mobile devices. In this regard, subsequent to the step 436, a further group of steps 438 is shown in FIG. 4B in which the fourth mobile device 208 initiates a visual pairing relationship with the third mobile device 206 and, additionally at a step 452, this visual pairing of the third and fourth mobile devices automatically triggers reestablishment of the pairing relationship between the second mobile device 204 and the third mobile device that was previously disconnected at the step 436. This reestablishment of the pairing relationship/connection between the second and third mobile devices occurs in a manner that is automatic and with significant ease, since the reestablishment of the pairing relationship between those mobile devices does not require any additional steps in which requests for pairing are transmitted, or in which coded messages are displayed, capture, or disclosed.

More particularly as shown, the group of steps 438 is identical or substantially identical to the group of steps 416, except that the initiator of the pairing is the fourth mobile device 208 relative to the third mobile device 206 rather than the third mobile device 206 relative to the second mobile device 204. Thus, at a step 440, the fourth mobile device 208 sends a request for pairing signal to the third mobile device 206, at a step 442 the third mobile device determines that it approves of the request for pairing and displays a coded image 444, and at a step 446 the fourth mobile device 208 captures and decodes the coded image. Further, at a step 448, the fourth and third mobile devices 208 and 206 exchange pairing data and at a step 450 the third and fourth mobile devices are visually-paired and the pairing relationship is complete such that wireless communications can occur. The step 448 (as well as the step 412) can also involve the generation and exchange of pairing codes as were discussed with respect to the step 428, although this need not occur in all embodiments. Thus, as a result of the group of steps 438 and as shown in FIG. 2, the third and fourth mobile devices 206 and 208 become paired and then enter into wireless communications as indicated by the communication link 216.

It should be understood that, although in the present embodiment it is the fourth mobile device 208 that initiates the establishment of the visual pairing relationship with the third mobile device 206, in other embodiments it can be the third mobile device 206 (that is, one of the mobile devices that was previously in a paired relationship that has been terminated) that initiates the establishment of a new visual pairing relationship with another mobile device such as the fourth mobile device 208. In embodiments where this is the case, rather than the group of steps 438 occurring, a modified version of that group of steps would instead occur, in which the step 440 at which the request for pairing was sent would involve wireless transmission of a signal from the third mobile device 206 to the fourth mobile device 208, the step 442 at which the coded image is generated would be modified to involve display of the coded image by the fourth mobile device 208 rather than the third mobile device 206, the step 446 at which the coded image is captured and detected would be performed by the third mobile device rather than the fourth mobile device, and the step 448 at which pairing data is exchanged could involve wireless signal transmission particularly from the third mobile device to the fourth mobile device (albeit such communication could also be bidirectional and include the transmission of pairing code(s) such as the pairing codes 429).

Further with respect to FIG. 4B, upon the third and fourth mobile devices 206 and 208 entering into the visually-paired relationship at the step 450, then at the step 452 the previously-disconnected visually-paired relationship between the second and third mobile devices 204 and 206 is reestablished/resurrected by invoking the pairing codes 429 that were previously exchanged by the second and third mobile devices at the step 428. That is, the second and third mobile devices 204 and 206 are automatically paired again and this pairing occurs without the earlier visual pairing steps 418, 420, 424, and 428 of the group of steps 416 needing to be re-performed. The reestablishment of the pairing relationship between the second and third mobile devices 204 and 206 is additionally shown in FIG. 2 by the communication link 218, which is again shown by a dashed line to indicate that it occurs directly as a response to the pairing and subsequent wireless communications between the third and fourth mobile devices 206 and 208 represented by the communication link 216. It should be appreciated that, upon the reestablishment of the visual pairing relationship between the second and third mobile devices 204 and 206 as represented by the step 452, further wireless communications between those two mobile devices then occurs as represented by the communication link 216.

In this example, in which the fourth mobile device 208 has entered into the visual pairing relationship with the third mobile device 206 (rather than the second mobile device 204) at the group of steps 438, it is the third mobile device 206 that particularly initiates the reestablishment of the pairing relationship with the second mobile device, by sending the appropriate pairing code(s) 429 to the second mobile device. However, in other embodiments, it could be the second mobile devices 204 that initiates the reestablishment of the pairing relationship with the third mobile device 206, for example, if it is the second mobile device that has entered into the pairing relationship with the fourth mobile device. Also, it should be appreciated that the actual communications involved in the automatic reestablishment of the pairing relationship between the second and third mobile device 204 and 206 typically involves both transmission of pairing code(s) from the third mobile device 206 to the second mobile device 204, and vice-versa, and that in some embodiments additional confirmational messages are also sent from the third mobile device to the second mobile device and vice-versa upon each respective mobile device's receipt and acceptance of the pairing code(s) transmitted from the other respective mobile device.

Thus, in the present embodiment, even though the second and third mobile devices 204 and 206 are disconnected at a first time (a time t=T1) corresponding to the step 436, the establishment of the pairing relationship between the third and fourth mobile devices 206 and 208 as a result of execution of the group of steps 438 beginning at a second time later than the first time (at a time t=T2, with T2 being greater or later than T1) ultimately results in the establishing of a new pairing session (or reestablishment of the previous pairing relationship) by the third mobile device 206 with the second mobile device 204 at a third time (t=T3, with T3 being greater or later than T2). The reestablishment of the pairing relationship between the second and third mobile devices 204 and 206 is based on the pairing codes previously generated and exchanged at the step 428. It should further be appreciated that, upon the reestablishment of the pairing relationship between the second and third mobile devices 204 and 206, the (indirect) pairing relationship between the third mobile device 206 and the first mobile device 202 also is reestablished and, given this to be the case, the fourth mobile device 208 becomes paired not only with the third mobile device 206 but also becomes paired automatically (indirectly) with the second mobile device 204 and the first mobile device 202 as represented by a step 454 in FIG. 4B. Thus, direct or indirect wireless communications also subsequently occur between the fourth mobile device 208 and each of the third, second, and first mobile devices 206, 204, and 202, respectively, as indicated in FIG. 2 by the communication links 216, 218, and 210, respectively.

Notwithstanding the above description, the present disclosure is intended to encompass numerous other embodiments that different from and/or in addition to those disclosed above. For example, although the diagrams provided and discussed above show particular orders of operations/steps, in other embodiments, one or more of these steps/operations can be changed in their order. Also in at least some other embodiments, one or more of the steps/operations described herein need not be performed. Further, although the present disclosure particularly envisions the establishment and reestablishment of pairing relationships that particularly are formed by way of visual pairing operations, other embodiments of the present disclosure relate to methods and systems in which pairing relationships that are established, and/or automatically reestablished following previous termination of those pairing relationships, are formed not by way of visual pairing techniques but rather are formed by way of other pairing techniques.

Thus, it is specifically intended that the present invention not be limited to the embodiments and illustrations contained herein, but include modified forms of those embodiments including portions of the embodiments and combinations of elements of different embodiments as come within the scope of the following claims.

I claim:

1. A method of communication by a first mobile device with second and third mobile devices, the method comprising:
　engaging in first communications with the second mobile device, with which the first mobile device is in a first paired relationship;
　terminating the first paired relationship;
　either receiving from the third mobile device a request to enter into a second paired relationship with the third mobile device or sending to the third mobile device the request to enter into the second paired relationship;
　either outputting an image for detection by the third mobile device, or detecting the image when output by the third mobile device;
　communicating with the third mobile device so as to establish the second paired relationship with the third mobile device; and
　upon establishing the second paired relationship, automatically reestablishing the terminated first paired relationship.

2. The method of claim 1, wherein subsequent to the reestablishing of the first paired relationship, the first mobile device engages in additional communications with the second mobile device.

3. The method of claim 1, wherein the second paired relationship is a visually paired relationship, and wherein the first paired relationship is a visually paired relationship.

4. The method of claim 3, wherein the method includes the detecting of the image, wherein the image is a coded image, and wherein the detecting includes capturing and decoding of the image.

5. The method of claim 2, wherein the communicating with the third mobile device includes either first communicating with the third mobile device so as to transmit for receipt by the third mobile device pairing data, or second communicating with the third mobile device so as to receive from the third mobile device the pairing data.

6. The method of claim 1, further comprising:
　prior to the terminating of the first paired relationship, communicating with the second mobile device so as to transmit a code for receipt by the second mobile device or to receive the code from the second mobile device.

7. The method of claim 6, wherein the reestablishing of the first paired relationship occurs subsequent to the establishing of the second paired relationship, and occurs based at least in part upon the first mobile device receiving the code from the second mobile device or the first mobile device transmitting the code for receipt by the second mobile device.

8. The method of claim 7, further comprising, additionally prior to the terminating of the first paired relationship:
　either receiving from the second mobile device a further request to enter into the first paired relationship with the second mobile device or sending to the second mobile device the further request to enter into the first paired relationship; and
　either outputting a further image for detection by the second mobile device, or detecting the further image when output by the second mobile device.

9. The method of claim 8, further comprising engaging in additional at least indirect communications with a fourth mobile device, with which either the first mobile device or the second mobile device is in an additional paired relationship, and wherein each of the first, second, third, and fourth mobile devices is associated with a single user.

10. The method of claim 1, wherein the terminating of the first paired relationship occurs because at least one of:
　a predetermined time period has elapsed since a last of the first communications occurred or since the first paired relationship was established;
　a maximum number of paired relationships between the first mobile device and a plurality of additional mobile devices including the second mobile device has been exceeded, as determined by the first mobile device; or
　the first mobile device has determined that the terminating is appropriate in order to satisfy an operational consideration of the first mobile device.

11. The method of claim 8, wherein the operational consideration of the first mobile device is either a battery power usage level or a communication level.

12. A method of reestablishing a first communication arrangement between a first electronic device and a second electronic device that has been terminated, the method comprising:
　either receiving at the first electronic device from a third electronic device a request to enter into a second communication relationship with the third electronic device or sending from the first electronic device for receipt by the third electronic device the request to enter into the second communication relationship;
　either outputting from the first electronic device an image for detection by the third electronic device, or detecting the image at the first electronic device when the image is output by the third electronic device;
　communicating with the third electronic device so as to establish the second communication arrangement with the third electronic device, wherein the second communication arrangement is a visual pairing relationship; and
　upon the second communication arrangement being established, either sending from the first electronic device for receipt by the second electronic device or receiving at the first electronic device from the second electronic device a previously-exchanged code,
　wherein the first communication arrangement between the first and second electronic devices is reestablished upon the previously-exchanged code being recognized or accepted by at least one of the first and second electronic devices.

13. The method of claim 12, wherein the first electronic device is a mobile device, and wherein the first communication arrangement is another visual pairing relationship.

14. The method of claim 13, further comprising conducting communications with a fourth electronic device upon the first communication arrangement being reestablished.

15. A first mobile device configured for reestablishing, with a second mobile device, a first visual pairing relationship that has been terminated, the first mobile device comprising:
　at least one memory component configured to store a first code and first image data;
　either a visual output component configured to display a first image based at least upon the first image data for receipt by a third mobile device, or a visual input component configured to sense light output by the third mobile device that is representative of the first image;
　at least one wireless transceiver configured to send for receipt by the third mobile device, or to receive from the third mobile device, at least one first wireless signal, and further configured to send for receipt by the second mobile device at least one second wireless signal including information based at least indirectly upon the first code;
　a processing device coupled at least indirectly to each of the at least one memory component, to either the visual output component or the visual input component, and to the at least one wireless transceiver, wherein the processing device is configured to make a first determination that a second visual pairing relationship has been established between the first mobile device and the third mobile device based at least indirectly upon an internal signal indicative of the sensed light or upon the at least one first wireless signal and further, upon the first determination being made, to cause the at least one wireless transceiver to send the at least one second wireless signal for receipt by the second mobile device, whereby at least indirectly in response to the at least one second wireless signal the first visual pairing relationship is reestablished.

16. The mobile device of claim 15, wherein the first processing device is configured to make the first determination either based upon a further determination that the internal signal is indicative of the first image, or that the at least one first wireless signal received from the third mobile device is an indication that the third mobile device has determined that the displayed first image is acceptable.

17. The mobile device of claim 15, wherein the first image data is representative of a at least one of a portion of text, a bar code, or a graphical image, and wherein the at least one memory component is additionally configured to store at least one of a predetermined time period, a maximum pairing criterion, a battery level criterion, or a communication level criterion.

18. The mobile device of claim 15, wherein the mobile device includes the visual input component and the visual input component includes an image sensor.

19. The mobile device of claim 18, wherein the mobile device includes the visual output component, and the visual output component includes a display screen or a touch screen display.

20. The first mobile device of claim 15, wherein the first mobile device is additionally configured for communicating either directly or indirectly with each of the second, third, and fourth mobile devices upon the first visual pairing relationship being reestablished.

* * * * *